United States Patent
Gierow et al.

(10) Patent No.: US 11,912,473 B2
(45) Date of Patent: Feb. 27, 2024

(54) PACKAGE WITH CURVED EDGES

(71) Applicant: SIG Technology AG, Neuhausen am Rheinfall (CH)

(72) Inventors: Norman Gierow, Dusseldorf (DE); Philippe Hauser, Schaffhausen (CH); Ali Kaylan, Duesseldorf (DE); Thomas Keck, Aachen (DE); Heike Klein, Dusseldorf (DE); Stefan Mergel, Duesseldorf (DE); Georg Schulte, Toenisvorst (DE); Christoph Wirtz, Linnich (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 17/780,883

(22) PCT Filed: Oct. 21, 2020

(86) PCT No.: PCT/EP2020/079569
§ 371 (c)(1),
(2) Date: May 27, 2022

(87) PCT Pub. No.: WO2021/104758
PCT Pub. Date: Jun. 3, 2021

(65) Prior Publication Data
US 2023/0016981 A1 Jan. 19, 2023

(30) Foreign Application Priority Data
Nov. 29, 2019 (DE) ..................... 10 2019 132 431.9

(51) Int. Cl.
*B65D 5/02* (2006.01)
*B32B 5/02* (2006.01)
(Continued)

(52) U.S. Cl.
CPC .............. *B65D 5/0209* (2013.01); *B32B 5/02* (2013.01); *B32B 27/12* (2013.01); *B65D 5/067* (2013.01);
(Continued)

(58) Field of Classification Search
CPC ...... B65D 5/064; B65D 5/4266; B65D 5/443; B65D 5/563; B65D 5/746; B65D 65/40;
(Continued)

(56) References Cited

U.S. PATENT DOCUMENTS

D454,063 S    3/2002  Dammers
6,929,171 B1* 8/2005  Thiersch ................ B65D 5/029
                                                    229/249

(Continued)

FOREIGN PATENT DOCUMENTS

DE    102006025744 A1    2/2008
DE    102016003826 A1   10/2017
(Continued)

*Primary Examiner* — Christopher R Demeree
(74) *Attorney, Agent, or Firm* — The Webb Law Firm

(57) ABSTRACT

Provided is a package made of a composite material is represented and described, including a package base with two front base corners and with two rear base corners, a package gable with two front gable corners and with two rear gable corners, and a package base body with a front panel, a first side panel, a second side panel and a rear panel. The package base and the package gable are arranged on opposite sides of the package base body. The composite material has a polymer inner layer, a polymer outer layer and a fibrous support layer, which is arranged between the polymer outer layer and the polymer inner layer. In order to enable the manufacture of packages with even more complex geometries without impairing the rigidity of the package, it is proposed to provide a third sleeve fold line, which has a plurality of sections, which each adjoin a side panel (Continued)

and the rear panel, and of which at least one section is curved.

19 Claims, 6 Drawing Sheets

(51) Int. Cl.
| | |
|---|---|
| *B32B 27/12* | (2006.01) |
| *B65D 5/06* | (2006.01) |
| *B65D 5/42* | (2006.01) |
| *B65D 5/74* | (2006.01) |
| *B65D 65/40* | (2006.01) |

(52) U.S. Cl.
CPC .......... *B65D 5/4266* (2013.01); *B65D 5/746* (2013.01); *B65D 65/40* (2013.01); *B32B 2250/03* (2013.01); *B32B 2250/40* (2013.01); *B32B 2439/62* (2013.01)

(58) Field of Classification Search
CPC .... B65D 3/08; B65D 5/0209; B32B 2439/70; B32B 27/10; B31B 50/00; B31B 50/64
USPC ................ 229/137, 213, 249, 125.42, 915.1; 53/374.2, 477
See application file for complete search history.

(56) References Cited

U.S. PATENT DOCUMENTS

| | | | | |
|---|---|---|---|---|
| 7,523,853 | B2* | 4/2009 | Kortsmit ................ | B65D 5/067 229/137 |
| 8,584,927 | B2* | 11/2013 | Rimondi ................ | B65B 49/08 229/137 |
| D852,620 | S | 7/2019 | D'Alfonso et al. | |
| 11,299,314 | B2 | 4/2022 | Dammers et al. | |
| 11,465,799 | B2 | 10/2022 | Dammers et al. | |
| D972,406 | S * | 12/2022 | Schulte .......................... | D9/417 |
| 11,643,239 | B2* | 5/2023 | Yoneda .................. | B65D 5/061 229/132 |
| 2004/0169066 | A1* | 9/2004 | Palm ...................... | B65D 5/067 229/110 |
| 2006/0144912 | A1* | 7/2006 | Franic .................... | B65D 5/067 229/125.42 |
| 2011/0113733 | A1* | 5/2011 | Franic .................... | B65D 5/067 53/167 |
| 2012/0279182 | A1* | 11/2012 | Barbieri ................. | B65B 3/025 229/164 |

FOREIGN PATENT DOCUMENTS

| | | |
|---|---|---|
| EP | 3228553 A1 | 10/2017 |
| WO | 0204301 A1 | 1/2002 |
| WO | 2004076302 A1 | 9/2004 |
| WO | 2009101029 A1 | 8/2009 |
| WO | 2011154173 A1 | 12/2011 |
| WO | 2017174210 A1 | 10/2017 |

* cited by examiner

PACKAGE WITH CURVED EDGES

CROSS-REFERENCE TO RELATED APPLICATIONS

This application is the U.S. national phase of International Application No. PCT/EP2020/079569 filed Oct. 21, 2020, and claims priority to German Patent Application No. 10 2019 132 431.9 filed Nov. 29, 2019, the disclosures of which are hereby incorporated by reference in their entirety.

BACKGROUND OF THE INVENTION

Field of the Invention

The invention relates to a package made of a composite material, comprising: a package base with two front base corners and with two rear base corners, a package gable with two front gable corners and with two rear gable corners, and a package base body with a front panel, a first side panel, a second side panel and a rear panel, wherein the package base and the package gable are arranged on opposite sides of the package base body, and wherein the composite material has a polymer outer layer, a polymer inner layer and a fibrous support layer, which is arranged between the polymer outer layer and the polymer inner layer.

Description of Related Art

Packaging (in filled condition: packages) can be manufactured in different ways and from an extremely wide range of materials. A widely used possibility for their manufacture consists of manufacturing a sleeve blank from the package material from which, through folding and further steps, first a package sleeve and finally a package is produced. Alternatively, it is also possible to manufacture a package directly from the blank, i.e. without the intermediate step of the package sleeve. This manufacturing method has the advantage, among others, that the sleeve blanks and package sleeves are very flat and can thus be stacked, saving space. In this way, the blanks or package sleeves can be manufactured in a different location to that where the folding and filling of the package sleeves takes place. Composite materials are frequently used as material, for example a composite consisting of a plurality of thin layers of paper, cardboard, plastic and/or metal, in particular aluminium. Such packages are widely used in the foodstuffs industry in particular.

Different packages made of composite material are known from the prior art. While such packages were originally quite simple geometric shapes, for example cuboid, increasingly more complex geometrical designs are being sought in order to be able to offer customers visually appealing and functionally advantageous packages. Packages made of composite material with more complex geometry are for example known from WO 02/04301 A1, WO 2011/154173 A1 and WO 2017/174210 A1.

A disadvantage of the packaging container described in WO 02/04301 A1 lies in the structure of the composite material. This is because WO 02/04301 A1 does not describe that the composite material has a plastic inner layer and a plastic outer layer, in particular no polymer inner layer or polymer outer layer.

The disadvantage of the package known from WO 2011/154173 A1 is that the edges in the sleeve region are approximately 90° and are therefore relatively strongly kinked. This can cause damage to the laminate, in particular cracks in the paper or cardboard layer of the laminate. In addition, the packages shown there are difficult to manufacture, since the sleeve surfaces have edges which are curved along their entire length, i.e. from the base to the gable.

In the composite package known from WO 2017/174210 A1, a disadvantage lies in the fact that the front side of the package merges into the side surfaces of the package without fold lines or folding edges such that the front side and the side surfaces form a common bulge. The continuous transition from the front side and side surfaces reduces the stress on the laminate, but makes a defined shaping of the package more difficult and can also lead to a reduced rigidity of the package sleeve. A further disadvantage is that the composite packages described in WO 2017/174210 A1 can only be manufactured in a time-consuming manner, since the rear side and the side surfaces are not only separated from one another by fold lines, but additional surfaces ("gripping panels") are provided between these sides of the composite package.

SUMMARY OF THE INVENTION

Against this background, the object underlying the invention is to design and further develop the package described at the outset and explained in more detail in such manner that the manufacture of packages, in particular liquid-tight packages, with even more complex geometries is made possible without impairing the rigidity of the package and without increased manufacturing effort.

This object is achieved in a package as described herein by a third sleeve fold line, which has a plurality of sections, which each adjoin a side panel and the rear panel, and of which at least one section is curved.

The package according to the invention is manufactured, partially or completely, from a composite material. The flat-shaped composite material has a plurality of overlapping and interconnected layers and thus forms a flat-shaped composite. The flat-shaped composite material comprises a polymer outer layer, a polymer inner layer and a fibrous support layer, which is arranged between the polymer outer layer and the polymer inner layer. The polymer inner layer and polymer outer layer give the composite material liquid-tight properties as they are manufactured from plastic. The fibrous support layer (preferably: paper or cardboard), on the other hand, primarily serves to give the composite material improved mechanical properties, in particular improved rigidity. Optionally, a barrier layer can also be provided, which is also arranged between the polymer outer layer and the polymer inner layer (preferably between the fibrous support layer and the polymer inner layer). The barrier layer can for example be manufactured from aluminium and is intended to prevent light and/or oxygen from passing through. The package can also have a plurality of folding edges, which are created during the manufacture of the package by folding the flat-shaped composite material along fold lines. The package initially comprises a package base with two front base corners and with two rear base corners. Adjacent base corners are connected to each other by lower package edges. The package also comprises a package gable with two front gable corners and with two rear gable corners. Adjacent gable corners are connected to each other by upper package edges. The package further comprises a package base body with a front panel, a first side panel, a second side panel and a rear panel. The front panel is preferably arranged opposite to the rear panel and the first side panel is preferably arranged opposite to the second side panel. The package base and the package gable are arranged on opposite sides of the package base body; in the case of a package standing on the package base, the package base is arranged below the package base body and the package gable is arranged above the package base body.

According to the invention, a third sleeve fold line is provided, which has a plurality of sections, which each adjoin a side panel and the rear panel, and of which at least one section is curved and of which at least one section is straight. According to one configuration of the package, it can be provided that the third sleeve fold line has a plurality of sections, which each adjoin a side panel and the rear panel, and of which at least one section is straight. By providing a folding line between the side panel and the adjoining rear panel, a folding edge with a defined course is achieved, which facilitates the manufacture of the package. The folding edge also improves the structural properties of the package, in particular the rigidity, compared to an edge-free curved shape. The curved course of the sleeve fold line also makes it easier to create convex or concave surfaces, creating air gaps between adjacent packages which improve air circulation. If straight sections are also provided in the third sleeve fold line in addition to curved sections, the manufacture of the package is facilitated. It may be provided that in each case a third sleeve fold line is provided between both side panels and the adjoining rear panel, which has a plurality of sections, which each adjoin a side panel and the rear panel, and of which at least one section is curved and of which at least one section is straight. Furthermore, it can be provided that the third sleeve fold line has at least two curvatures, which are directed in different directions, i.e. for example a first curvature in the direction of the side surface and a second curvature in the direction of the adjoining rear surface ("curved edge"). This further improves the air circulation between adjacent packages.

According to one configuration of the package, it is provided that the third sleeve fold line ends with one of its two ends at one of the two rear gable corners and ends with its other end at one of the two rear base corners. By the third sleeve fold line ending with both ends at a gable corner or base corner or adjoining said corner, an increased rigidity of these corners of the package is achieved.

According to a further configuration of the package, it is provided that the section of the third sleeve fold line adjoining the package base and the section of the third sleeve fold line adjoining the package gable are straight. The use of straight sections adjoining the package base and adjoining the package gable is particularly advantageous, since in this way the use of simpler tools is possible to manufacture the bases and gables of the packages.

According to a further design of the package, it is provided that at least two sections of the third sleeve fold line have opposite curvature directions. In particular, it can be provided that a section is curved in the direction of the rear panel and that a section is curved in the direction of the side panel. In this way, a package can be achieved which has both convex and concave surfaces or panels. Preferably, the section of the third sleeve fold line curved in the direction of the side panel is arranged above the section of the third sleeve fold line curved in the direction of the rear panel. This leads to a wide, concave rear side of the package in the upper region, in particular in the upper half of the package. Since the packages preferably have a narrow, convex front side in their upper region, in particular in the upper half, a plurality of packages can be placed in front of or behind one another in a space-saving manner so that a good use of space is achieved. In addition, it can be achieved by opposite curvature directions that the filling volume reduced by the one curvature direction is compensated again by the other curvature direction such that the package height for a given package volume can remain unchanged.

According to one configuration of the package, it is provided that the package base body has at least one stress-relief panel, which is arranged between the front panel and one of the two side panels. The stress-relief panel is used to create the smoothest possible transition between the front panel and the side panel. Preferably, the stress-relief panel extends over the entire height of the package base body, i.e. from the package base to the package gable and therefore separates the front panel from the two side panels. The technical effect of the stress-relief panel is that the composite material needs to be folded or kinked less than a 90° edge of a cuboid package, since the transition from the front panel to the two side panels takes place through two less strongly kinked ("blunter") edges. This leads to less stresses on the composite material and in particular to a lower risk of cracked or broken fibres in the fibrous support layer (paper or cardboard layer) of the composite material. Preferably, the package has two stress-relief panels, which are arranged between the front panel and each of the two side panels. The stress-relief panels also ensure that a gap or free space between adjacent packages is created between packages arranged next to one another, in contrast to cuboid packages, in the region of the stress-relief panels, through which air can circulate. This has the advantage of reducing the risk of mould forming as a result of moisture. A further advantage of stress-relief panels can be seen in that the panels or surfaces adjoining the stress-relief panels can be designed to be narrower and thus more stable, whereby an increased grip rigidity can be achieved when pouring out the filled package.

According to one configuration of the package, it is provided that the stress-relief panel and the front panel adjoin the same edge of the package, in particular an edge of the package base. In particular, it can be provided that the stress-relief panel and the front panel together adjoin the lower front package edge. According to a further configuration of the package, it is provided that the stress-relief panel and one of the two side panels adjoin the same edge of the package, in particular an edge of the package gable. In particular, it can be provided that the stress-relief panel and one of the two side panels together adjoin an upper lateral package edge. This configuration preferably results in the stress-relief panel and the front panel and/or adjoining side panel (except in the region of the base edge or the gable edge on which the panels converge) running at an angle to one another. In other words, the stress-relief panel in its lower region is to be assigned to the front panel of the package, while in its upper region it is to be assigned to the side panel of the package. The stress-relief panel therefore "wraps" completely around an (imaginary) vertical edge of the package. This design of the stress-relief panels has the advantage that the previously described technical effects (reduced stress on the composite material, improved air circulation) occur not only on one side of the package, but on two sides of the package.

According to a further design of the package, it is proposed that a first sleeve fold line, which is preferably curved at least in sections, is provided between at least one stress-relief panel and the adjoining front panel. By providing a fold line between the stress-relief panel and the front panel, a folding edge with a defined course is achieved, which facilitates the manufacture of the package. The folding edge also improves the structural properties of the package, in particular the rigidity, compared to an edge-free curved shape. The curved course of the sleeve fold line also makes it easier to create convex or concave surfaces or panels, creating air gaps between adjacent packages which improve air circulation. It may be provided that a first sleeve fold line, which is preferably curved at least in sections, is provided in each case between both stress-relief panels and the adjoining front panel. It can also be provided that the first sleeve fold line runs continuously curved.

Regarding this design, it is further proposed that the first sleeve fold line ends only with one of its two ends at one of the two front gable corners or at one of the two front base corners and with its other end does not end at a gable corner or at a base corner. By the first sleeve fold line, at one of its ends, ending at one of the two front gable corners or at one of the two front base corners or adjoining them, an increased rigidity of these corners of the package is achieved. By the other end of the first sleeve fold line not ending at a package corner and also not adjoining it, on the other hand, it is possible to achieve a smooth and flat as possible transition between the two surfaces or panels separated by the first sleeve fold line. For example, it can be provided that the other end of the first sleeve fold line ends at or adjoins a package edge, whereby the two surfaces or panels separated by the first sleeve fold line and approaching the package edge can in any case lie in sections approximately in one plane.

According to a further design of the package, it is provided that a second sleeve fold line, which is preferably curved at least in sections, is provided between at least one stress-relief panel and the adjoining side panel. As has already been explained in connection with the first sleeve fold line, a folding edge with a defined course is also achieved by the second sleeve fold line, which facilitates the manufacture of the package. The folding edge also improves the structural properties of the package, in particular the rigidity, compared to an edge-free curved shape. The curved course of the sleeve fold line also makes it easier to create convex or concave surfaces or panels, creating air gaps between adjacent packages which improve air circulation. It may be provided that a second sleeve fold line, which is preferably curved at least in sections, is provided in each case between both stress-relief panels and the adjoining side panels. It can also be provided that the second sleeve fold line runs continuously curved.

Regarding this design, it is further proposed that the second sleeve fold line ends only with one of its two ends at one of the two front gable corners or at one of the two front base corners and with its other end does not end at a gable corner or at a base corner. As already described for the first sleeve fold line, an increased rigidity of the package corners can be achieved if an end of the second sleeve fold line ends in this corner or adjoins this corner. By the other end of the second sleeve fold line not ending at a package corner and also not adjoining it, on the other hand, it is possible to achieve a smooth and flat as possible transition between the two surfaces or panels separated by the second sleeve fold line. For example, it can be provided that the other end of the second sleeve fold line ends at or adjoins a package edge, whereby the two surfaces or panels separated by the second sleeve fold line and approaching the package edge can in any case lie in sections approximately in one plane.

According to a further configuration of the package, it is provided that the package has a fin seam in the region of the package gable which is turned over in the direction of the front panel. This design enables, for example, a better drainage of moisture from the package gable in the case of an oblique gable sloping forwards, since no "pocket" open at the top forms in which moisture could collect. This design also allows more space to be achieved for a dispenser sealed from the inside.

According to a further design of the package, it is provided that the package gable is approximately trapezoidal. The trapezoidal shape of the package gable has the advantage that one of the two parallel sides or edges (preferably the front edge of the package gable) is shorter than the opposite side or edge (preferably the rear edge of the package gable), unlike a rhombus in which the opposite sides are the same length. This makes it easy to grip larger-volume packages from the front side with one hand.

A further configuration of the package provides that the package gable is an oblique gable. In particular, it can be provided that the package gable falls forwards, i.e. is lower in the region of the front side of the package than in the region of the rear side of the package. Due to the oblique course of the package gable, it can be achieved that a dispensing element arranged in the region of the package gable impairs the stacking of packages less than in packages with a flat package gable. This is due to the fact that the dispensing element does not necessarily form the highest point of the package in packages with an oblique gable, unlike packages with a flat gable. In addition, better drainage of moisture from the package gable can be achieved.

According to a further configuration of the package, it is provided that the package gable has a front edge, which is curved and which adjoins the front panel. Preferably, the front edge of the package gable is curved in the direction of the front panel. In this way, the surface of the package gable can be enlarged, which for example facilitates the attachment of dispensing elements with a larger diameter. A curved front edge of the package gable also influences the shape of the front panel of the package. In particular, a front edge curved in the direction of the front panel can achieve an outwardly-arched (convex) front panel of the package. In addition to an appealing appearance, this also has the previously described technical advantage of improved air circulation between adjacently arranged packages, which reduces the risk of mould formation.

According to a further design of the package, it is provided that the front panel is convex and/or the rear panel is at least partially concave. In particular, it can be provided that the package is convex in the region of the front panel in the upper region, in particular in the upper half, and/or is concave in the region of the rear panel in the upper region, in particular in the upper half. Through the combination of convex front side and concave rear side, the packages can be arranged in front of or behind one another in a space-saving manner despite their visually complex design.

Regarding this configuration, it is further proposed that the front panel has its maximum convex bulge above half the height of the package base body. By the front panel being arched particularly far outwards or forwards in the upper region, the front panel can be designed particularly narrowly in the upper region without the volume of the package being reduced compared to a cuboid package; the bulge forwards therefore offsets the lateral slimming. Through the lateral slimming, the package can be gripped easily from the front, for example to remove it from a sales shelf with one hand.

According to a further design of the package, it is provided that the two front gable corners have two large gable corner angles, which are each greater than 90°. Alternatively or additionally, it can be provided that the two rear gable corners can have two small gable corner angles, which are each smaller than 90°. Angles that are not equal to 90° result in a package gable whose shape deviates from a rectangular or square shape. A quadrangular package gable with two small (<90°) and two large (>90°) gable corner angles can for example be achieved by means of a trapezoid, a parallelogram or by a rhombus. In this way, it is possible to achieve a package gable with differently long edges, whereby, for example, a short front edge can be achieved through which the package can be gripped particularly easily from the front.

Lastly, according to a further configuration of the package, it is provided that the four gable corner angles have an angle sum, which is greater than 360°. An angle sum deviating from 360° can for example be achieved by one or a plurality of sides or edges of the quadrangular package gable not running straight, but curved (as for example in the case of an arched quadrilateral or arched polygonal). An angle sum greater than 360° can be achieved by at least one side or edge of the quadrangular package gable being curved outwards. The base corner angles, on the other hand, are preferably 90°, so that a rectangular, in particular square package base results. This design of the package gable has a plurality of advantages. In addition to a more visually appealing shape, the technical effect is achieved such that packages can be gripped more easily with one hand, since an edge of the package gable (preferably the front edge) is shorter than the other edges (in particular the rear edge), so that the package is narrower on the front side. This design also leads to the technical effect that the contact surface between packages arranged next to one another (e.g. during transport or on the sales shelf) is smaller than in the case of cuboid packages, whose side panels almost completely touch. In other words, there is a gap or free space between packages arranged next to each other through which air can circulate. This has the advantage of reducing the risk of mould forming as a result of moisture. By the angle sum being greater than 360°, it is also achieved that there is more space for a dispensing element. Preferably, the quadrangular package gable has an angle sum of at least 370°, in particular of at least 380°, preferably of at least 390°. Angle sums in the range between 390° and 410° have proven to be advantageous.

BRIEF DESCRIPTION OF THE DRAWINGS

The invention will be explained in more detail below with reference to a drawing which simply represents a preferred exemplary embodiment, in which is shown.

DESCRIPTION OF THE INVENTION

Figure 1A:
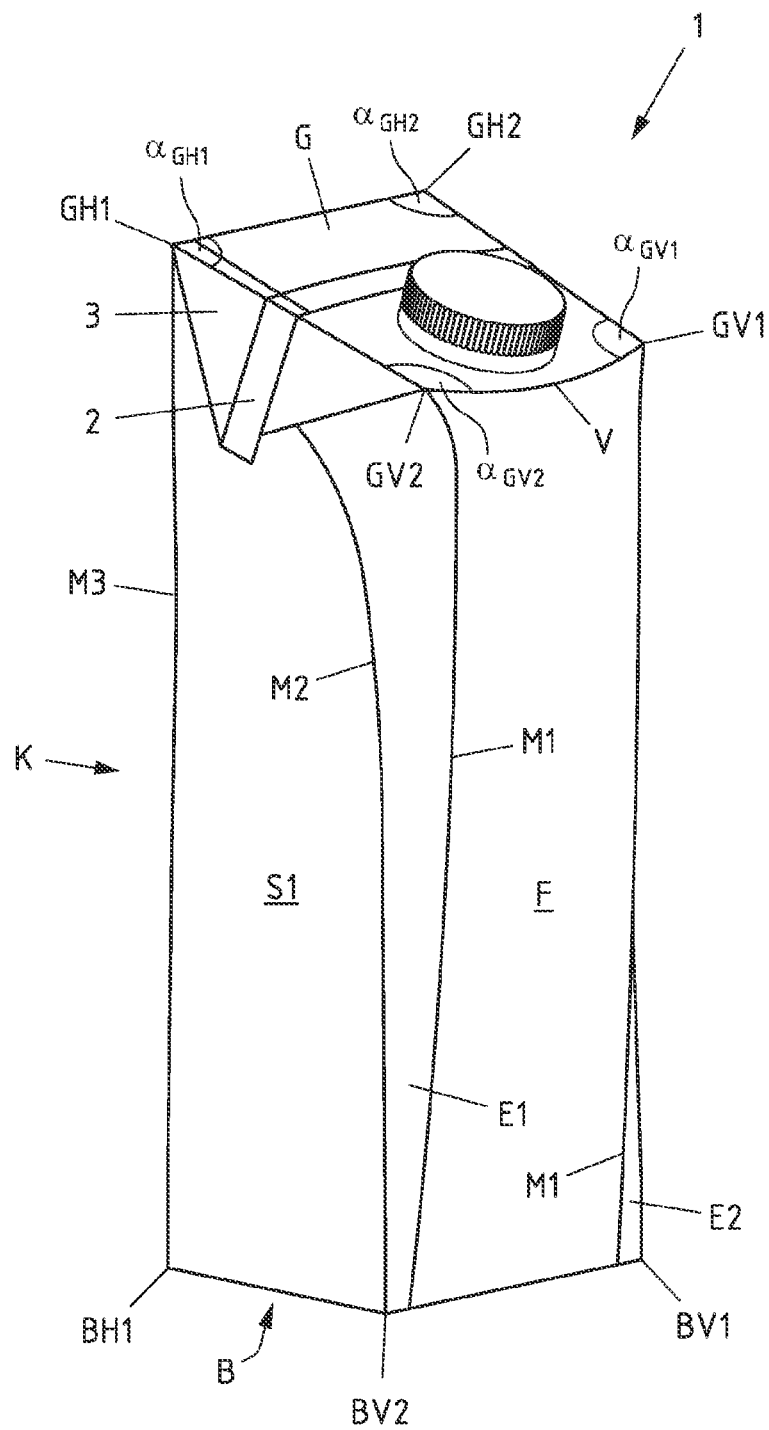
FIG. 1A: a package according to the invention in perspective view.
Figure 1B:
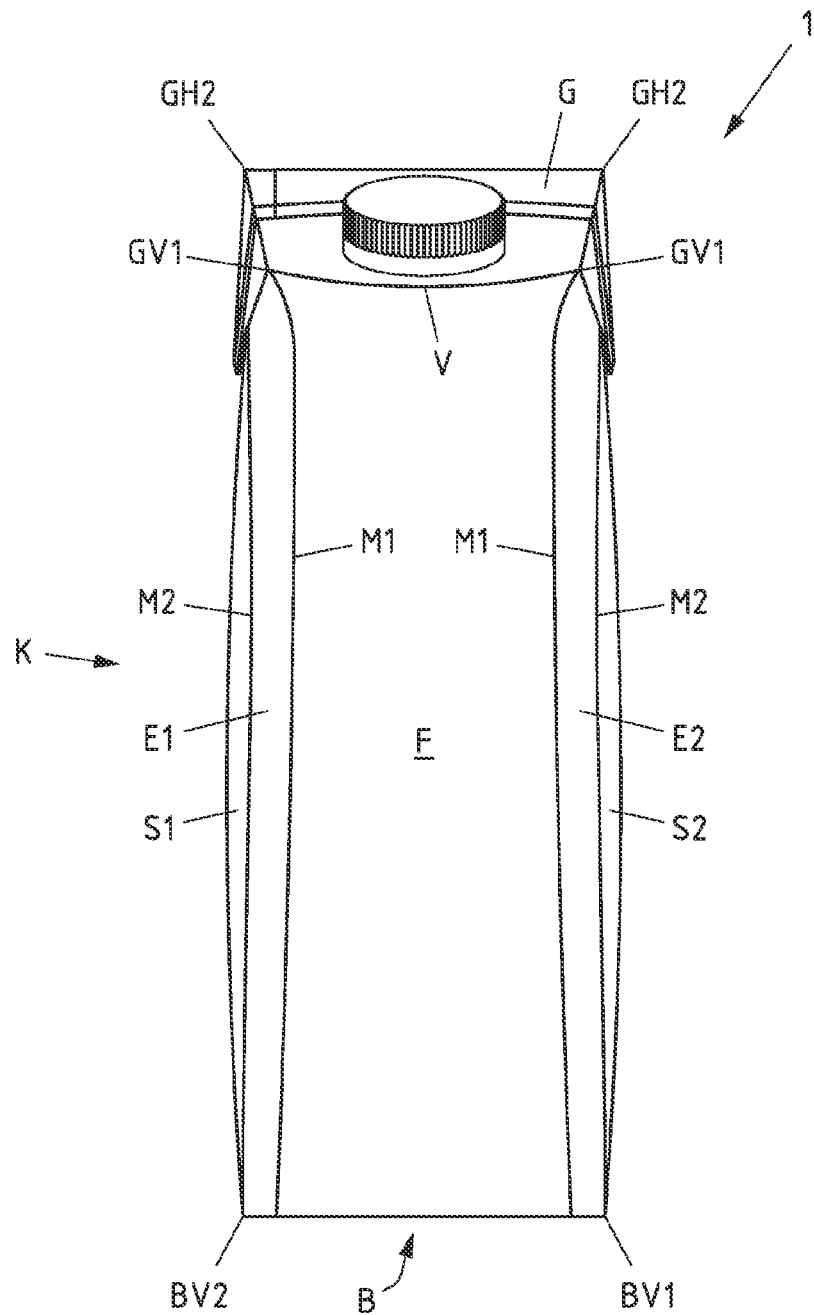
FIG. 1B: the package from FIG. 1A in a front view.
Figure 1C:
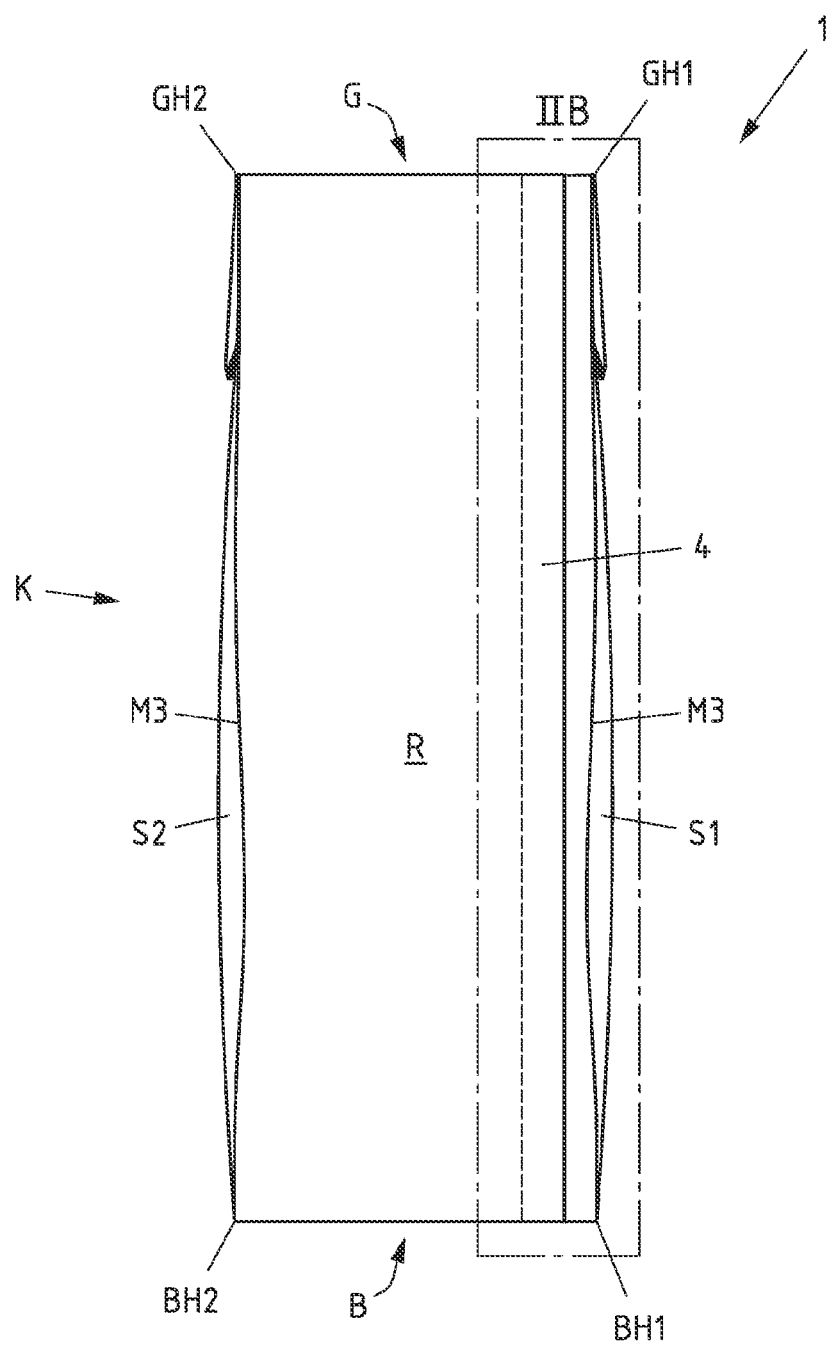
FIG. 1C: the package from FIG. 1A in a rear view.
Figure 1D:
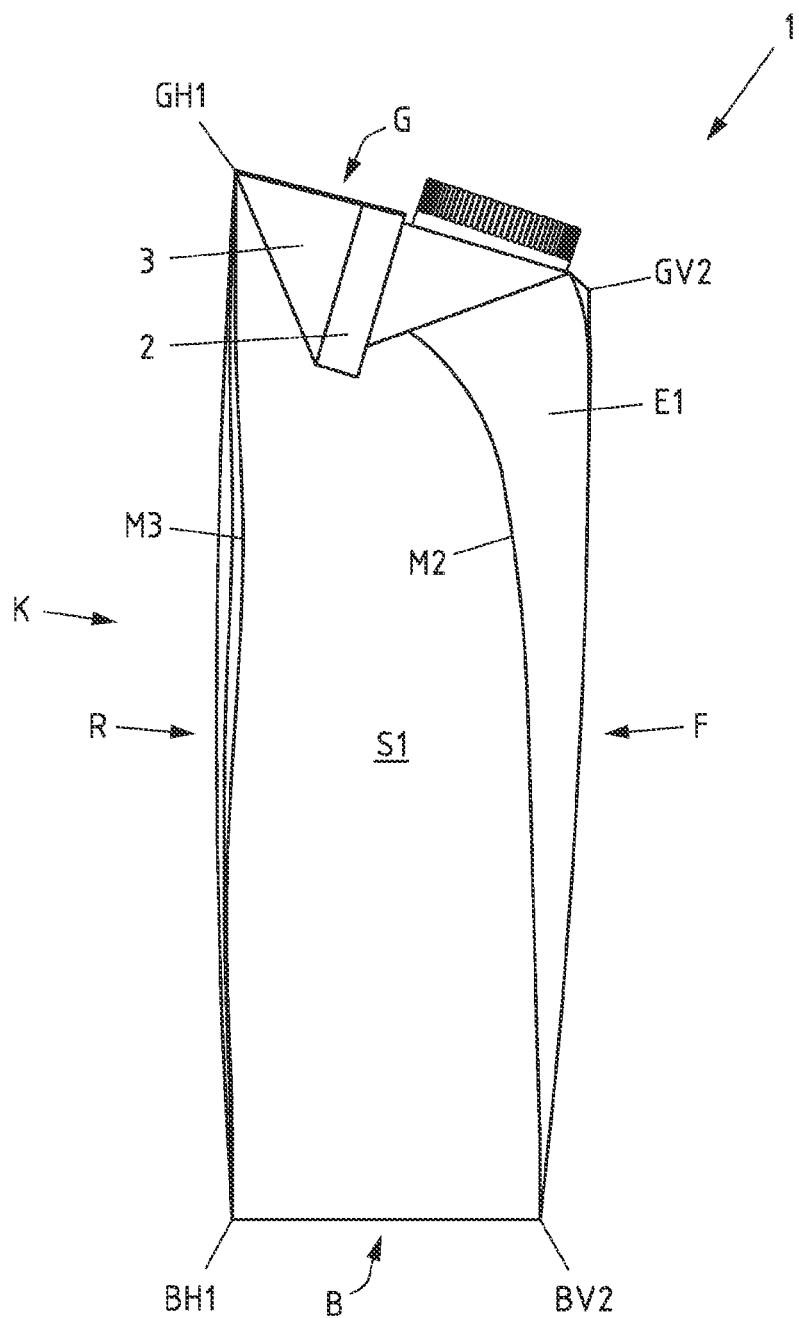
FIG. 1D: the package from FIG. 1A in a side view.

FIG. 1A shows a package 1 according to the invention in perspective view. FIG. 1B shows the package 1 from FIG. 1A in a front view, FIG. 1C in a rear view and FIG. 1D in a side view. The package 1 has a quadrangular package base B, which has two front base corners BV1, BV2 and two rear base corners BH1, BH2. The package 1 also has a quadrangular package gable G, which has two front gable corners GV1, GV2 and two rear gable corners GH1, GH2. In addition, the package 1 has a package base body K which comprises a front panel F, a first side panel S1, a second side panel S2 and a rear panel R. The package base body K is arranged between the package base B and the package gable G such that the package base B and the package gable G are arranged on opposite sides of the package base body K and form a sleeve surface of the package 1. The package 1 is partially or completely manufactured from a composite material which has a polymer outer layer, a polymer inner layer and a fibrous support layer, which is arranged between the polymer outer layer and the polymer inner layer. The fibrous support layer can for example be a layer of paper or cardboard. In the region of the package gable G, the package 1 has a fin seam 2, which is turned over in the direction of the front panel F. In the region of the package gable G, the package 1 also has two ears 3, of which one ear 3 is applied on the first side panel S1 and of which the second ear 3 is applied on the second side panel S2. In the region of the rear panel R, the package 1 has a longitudinal seam 4. The package gable G is approximately trapezoidal and designed as an oblique gable (like a pitched roof). The package gable G has a front edge V, which is curved in the direction of the front panel F and adjoins the front panel F. More detail will be given on the shape of the package gable in connection with FIG. 2A.

The package base body K of the package 1 shown in FIG. 1A to FIG. 1D has two stress-relief panels E1, E2, of which the first stress-relief panel E1 is arranged between the front panel F and the first side panel S1 and of which the second stress-relief panel E2 is arranged between the front panel F and the second side panel S2. The stress-relief panels E1, E2 therefore separate the front panel F from the two side panels S1, S2 and form a transition between the front panel F and the two side panels S1, S2. The first stress-relief panel E1 and the second stress-relief panel E2 lie in the region adjoining the package base B with the front panel F in sections in one plane. However, the first stress-relief panel E1 lies in the region adjoining the package gable G with the first side panel S1 in sections in one plane; similarly, the second stress-relief panel E2 lies in the region adjoining the package gable G with the second side panel S2 in sections in one plane. The two stress-relief panels E1, E2 are therefore assigned in their lower regions to a different side of the package 1 than in their upper regions; the two stress-relief panels E1, E2 therefore "wrap" around an imaginary package edge from the front panel F in the direction of one of the two side panels S1, S2.

In the package 1 shown in FIG. 1A to FIG. 1D, a first sleeve fold line M1, which is continuously curved, is provided between the front panel F and the first stress-relief panel E1. A first sleeve fold line M1, which is continuously curved, is also provided between the front panel F and the second stress-relief panel E2. The two first sleeve fold lines M1 adjoin, with their upper ends, the two front gable corners GV1, GV2. With their two lower ends, however, the two first sleeve fold lines M1 do not adjoin the two front base corners BV1, BV2, but rather at points of the lower front package edge located between them. In the package 1, a second sleeve fold line M2, which is continuously curved, is also provided between the first stress-relief panel E1 and the adjoining first side panel S1. A second sleeve fold line M2, which is continuously curved, is also provided between the second stress-relief panel E2 and the adjoining second side panel S2. The two second sleeve fold lines M2 adjoin, with their lower ends, the two front gable corners BV1, BV2. With their two upper ends, however, the two second sleeve fold lines M1 do not adjoin the two front gable corners GV1, GV2, but at points of the upper lateral package edges located between the front gable corners GV1, GV2 and the rear gable corners GH1, GH1. In package 1 shown in FIG. 1A to FIG. 1D, a third sleeve fold line M3 is provided between the first side panel S1 and the adjoining rear panel R. A third sleeve fold line M3 is also provided between the second side panel S1 and the adjoining rear panel R. The third sleeve fold line M3 adjoins, with its one end, one of the two rear gable corners GH1, GH2 and adjoins, with its other end, one of the two rear base corners BH1, BH2. More detail will be given on the exact course of the third sleeve fold line M3 in connection with FIG. 2B.

From the side view (FIG. 1D), it is particularly clear that the front panel F is convex, i.e. arched outwards. The front panel F has the maximum convex bulge above half the height of the package base body K. It is also discernible in FIG. 1D that the rear panel R is concave, i.e. arched inwards.

Figure 2A:
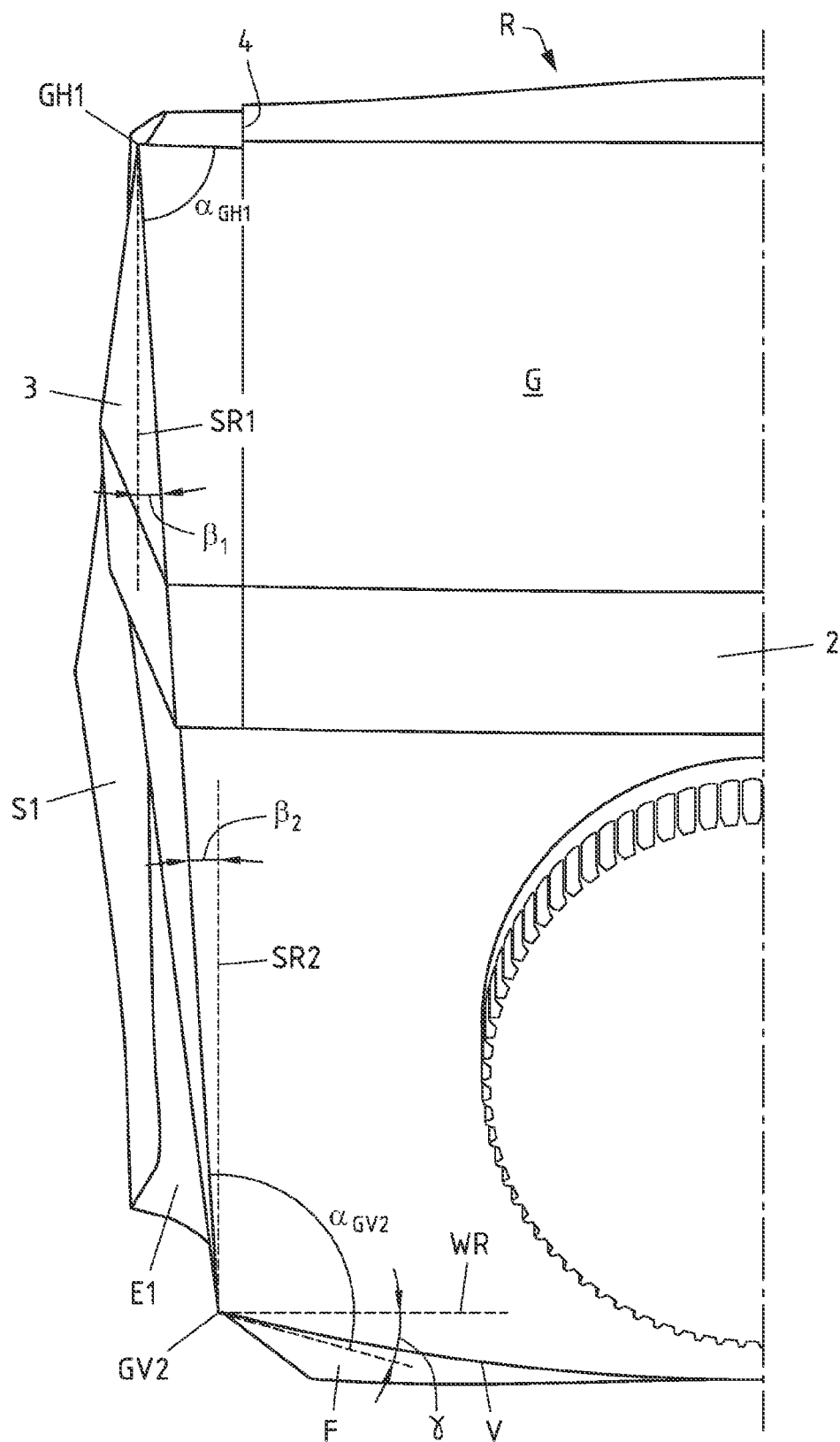
FIG. 2A: a first region of the package from FIG. 1A in enlarged view.

FIG. 2A shows a first region of the package 1 from FIG. 1A in enlarged view. The regions of the package 1 already described in connection with FIG. 1A to FIG. 1D are provided with corresponding reference numerals in FIG. 2A. The first region of the package represented in FIG. 2A relates to the region of the package gable G, in particular to the region of the front gable angle GV2 (and the gable corner angle $\alpha_{GV2}$) and to the region of the rear gable angle GH1 (and the gable corner angle $\alpha_{GH1}$). The same applies to the other half of the package gable G (not represented in FIG. 2A) due to symmetry. The four corners of the package gable G are not at right angles: The two front gable corners GV1, GV2 have front gable corner angles $\alpha_{GV1}$, $\alpha_{GV2}$, which are slightly larger than 90° ($\alpha_{GV1}$, $\alpha_{GV2}$>90°) and the two rear gable corners GH1, GH2 have rear gable corner angles $\alpha_{GH1}$, $\alpha_{GH2}$, which are slightly smaller than 90° ($\alpha_{GH1}$, $\alpha_{GH2}$<90°. For the rear gable corner angles $\alpha_{GH1}$, $\alpha_{GH2}$, the deviation from a right angle is due to the fact that the upper lateral package edges adjoining the rear gable corner angles $\alpha_{GH1}$, $\alpha_{GH2}$ do not run at right angles to the upper rear package edge, but are inclined by an angle $\beta_1$ with respect to a vertical SRI ($\alpha_{GH1}=\alpha_{GH2}=90°-\beta_1$). For the front gable corner angles $\alpha_{GV1}$, $\alpha_{GV2}$, the deviation from a right angle has two reasons: Firstly, the upper lateral package edges adjoining the front gable corner angles $\alpha_{GV1}$, $\alpha_{GV2}$ do not run at right angles to the rear package edge, but are inclined by an angle $\beta_2$ with respect to a vertical SR2. Secondly, the front edge V also adjoining the front gable corner angles $\alpha_{GV1}$, $\alpha_{GV2}$ does not run straight, but curved in the direction of the front panel F, wherein the front edge V (or a tangent which touches the front edge V in the region of the front gable corners GV1, GV2 or the gable corner angle $\alpha_{GV1}$, $\alpha_{GV2}$ is inclined by an angle $\gamma$ with respect to a horizontal WR (which runs parallel to the upper rear package edge) ($\alpha_{GV1}=\alpha_{GV2}=90°+\beta_2+\gamma$). The angle $\beta_1$ corresponds to the angle $\beta_2$; both angles are preferably in the range between 2° and 6°. The two rear gable corner angles $\alpha_{GH1}$, $\alpha_{GH2}$ can therefore, for example, be in the range of approx. 86°. The angle $\gamma$ is preferably in the range between 15° and 25°. The two front gable corner angles $\alpha_{GV1}$, $\alpha_{GV2}$ can therefore be in the range of approximately 113°, for example. From the described design, in particular from the curved front edge V, it follows that the angle sum of the quadrangular package gable G is greater than 360° ($\alpha_{GV1}+\alpha_{GV2}+\alpha_{GH1}+\alpha_{GH2}$>360°.

Figure 2B:
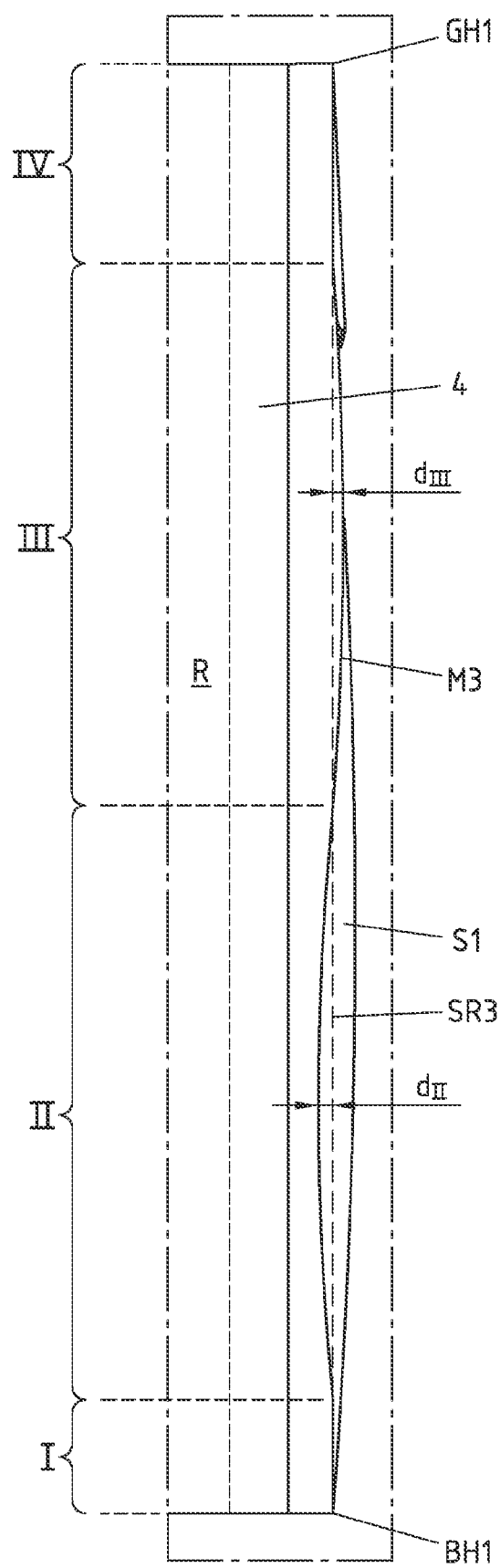
FIG. 2B: a second region of the package from FIG. 1A in enlarged view.

FIG. 2B shows a second region of the package 1 from FIG. 1A in enlarged view. The regions of the package 1 already described in connection with FIG. 1A to FIG. 2A are provided with corresponding reference numerals in FIG. 2B. The second region of the package 1 represented in FIG. 2B relates to the region of the third sleeve fold line M3, which separates the rear panel R from the two side panels S1, S2 (in FIG. 2B only one of the two third sleeve fold lines M3 is represented; the same applies to the other third sleeve fold line M3 due to symmetry). The third sleeve fold line M3 arranged between the rear panel R and the adjoining side panels S1, S2 has four sections I-IV: the first section I adjoins the package base B and runs straight. The second section II adjoins the first section I and runs curved (in the direction of the rear panel R). As a result of the curvature, there is a maximum distance $d_{II}$ between the third sleeve fold line M3 and a vertical SR3, which can lie in the range between 0.5 mm and 2.5 mm. The third section III adjoins the second section II and runs curved (in the direction of the first side panel S1). As a result of the curvature, there is a maximum distance dm between the third sleeve fold line M3 and the vertical SR3, which can lie in the range between 0.5 mm and 2.5 mm. The second section II and the third section III therefore have opposite curvatures or curvature directions. The fourth section IV adjoins the third section III and the package gable G and runs straight. The third sleeve fold line M3 therefore runs straight in sections (in the section I adjoining the package base B and in the section IV adjoining the package gable G) and curved in sections (in the two "centre" sections II, III).

LIST OF REFERENCEE NUMERALS

1: Package
2: Fin seam
3: Ear
4: Longitudinal seam
$\alpha_{GV1}$, $\alpha_{GV2}$: Front gable corner angles
$\alpha_{GH1}$, $\alpha_{GH2}$: Rear gable corner angles
$\beta_1$, $\beta_2$: Inclination angle
$\gamma$: Inclination angle
B: Package base
BV1, BV2: Front base corner
BH1, BH2: Rear base corner
$d_{II}$, $d_{III}$: Distance
E1 E2: Stress-relief panel
F: Front panel
G: Package gable
GV1, GV2: Front gable corner
GH1, GH2: Rear gable corner
K: Package base body
M1: First sleeve fold line
M2: Second sleeve fold line
M3: Third sleeve fold line
R: Rear panel
S1, S1: Side panel
SR1, SR2, SR3: Vertical
V: Front edge (of package gable G)
WR: Horizontal
I, II, III, IV: Sections (of the third sleeve fold line M3)

The invention claimed is:
1. A package made of composite material, comprising:
a package base with two front base corners and with two rear base corners,
a package gable with two front gable corners and with two rear gable corners, and
a package base body with a front panel, a first side panel, a second side panel and a rear panel,
wherein the package base and the package gable are arranged on opposite sides of the package base body, wherein the composite material has a polymer outer layer, a polymer inner layer and a fibrous support layer, which is arranged between the polymer outer layer and the polymer inner layer, and a third sleeve fold line, which has a plurality of sections, which each adjoin a side panel and the rear panel, and of which at least one section is curved, wherein at least one section of the third sleeve fold line is straight and/or at least two sections of the third sleeve fold line have opposite curvature directions.

2. The package according to claim 1, wherein the third sleeve fold line ends with one of its two ends at one of the two rear gable corners and ends with its other end at one of the two rear base corners.

3. The package according to claim 2, wherein the section of the third sleeve fold line adjoining the package base and the section of the third sleeve fold line adjoining the package gable are straight.

4. The package according to claim 1, wherein the package base body has at least one stress-relief panel which is arranged between the front panel and one of the two side panels.

5. The package according to claim 4, wherein the stress-relief panel and the front panel adjoin the same edge of the package, in particular an edge of the package base.

6. The package according to claim 4, wherein the stress-relief panel and one of the two side panels adjoin the same edge of the package, in particular an edge of the package gable.

7. The package according to claim 4, wherein a first sleeve fold line, which is preferably curved at least in sections, is provided between at least one stress-relief panel and the adjoining front panel.

8. The package according to claim 7, wherein the first sleeve fold line ends only with one of its two ends at one of the two front gable corners or at one of the two front base corners and does not end with its other end at a gable corner or at a base corner.

9. The package according to claim 1, wherein a second sleeve fold line, which is preferably curved at least in sections, is provided between at least one stress-relief panel and the adjoining side panel.

10. The package according to claim 9, wherein the second sleeve fold line ends only with one of its two ends at one of the two front gable corners or at one of the two front base corners and does not end with its other end at a gable corner or at a base corner.

11. The package according to claim 1, wherein the package has a fin seam in a region of the package gable, which is turned over in the direction of the front panel.

12. The package according to claim 1, wherein the package gable is approximately trapezoidal.

13. The package according to claim 1, wherein the package gable is an oblique gable.

14. The package according to claim 1, wherein the package gable has a front edge, which is curved and which adjoins the front panel.

15. The package according to claim 1, wherein the front panel is convex and/or the rear panel is at least partially concave.

16. The package according to claim 15, wherein the front panel has its maximum convex bulge above half the height of the package base body.

17. The package according to claim 1, wherein the two front gable corners have two large gable corner angles, which are each greater than 90°.

18. The package according to claim 1, wherein the two rear gable corners have two small gable corner angles, which are each smaller than 90°.

19. The package according to claim 1, wherein the four gable corner angles have an angle sum, which is greater than 360°.

* * * * *